United States Patent [19]
Mackintosh

[11] 4,274,503

[45] Jun. 23, 1981

[54] POWER OPERATED WHEELCHAIR

[76] Inventor: Charles Mackintosh, 3838 Oakwood Ave., Los Angeles, Calif. 90004

[21] Appl. No.: 78,096

[22] Filed: Sep. 24, 1979

[51] Int. Cl.[3] .............................................. B62D 61/10

[52] U.S. Cl. ...................................... 180/23; 180/236; 180/329; 180/DIG. 3

[58] Field of Search ............... 180/252, DIG. 3, 77 P, 180/77 L, 77 M, 77 N, 77 Q, 89.13, 234, 236, 21, 22, 23, 24, 329, 330; 280/47.11

[56] References Cited

U.S. PATENT DOCUMENTS

| | | | |
|---|---|---|---|
| 3,642,088 | 2/1972 | Smith | 180/77 Q |
| 3,825,087 | 7/1974 | Wilson | 180/236 X |
| 3,938,608 | 2/1976 | Folco-Zambelli | 280/47.11 |
| 3,972,379 | 8/1976 | Norris | 180/234 |

FOREIGN PATENT DOCUMENTS

| | | | |
|---|---|---|---|
| 6609100 | 1/1967 | Netherlands | 180/239 |

*Primary Examiner*—John A. Pekar
*Attorney, Agent, or Firm*—Watson, Cole, Grindle & Watson

[57] ABSTRACT

A wheelchair assembly includes an occupant seat having a central shaft for mounting the seat on an undercarriage for universal tilting movement, for vertical movement along the shaft axis and for rotation about such axis. The undercarriage has a plurality of ground engaging wheels driven together by a driving mechanism which includes a drive motor and steered together by a steering mechanism which includes a steering motor. The steering motor may be operatively connected with both the seat and the wheels for turning them together by operation of a control assembly, or the steering motor may be operatively connected with only the seat or with only the wheels for independent operation. Otherwise, the steering mechanism may couple the seat with the wheels while the steering motor is disconnected so that wheel steering may be operated by a manual turning of the seat. An analyzer assembly compares the direction of travel chosen by the seat occupant to the actual orientation of the wheels and then directs the steering motor to align the wheels to the direction chosen, without turning the chair. And, the seat is automatically tilted toward a direction opposite that to which, it tends to lean when the wheelchair moves up an incline or down a decline.

23 Claims, 21 Drawing Figures

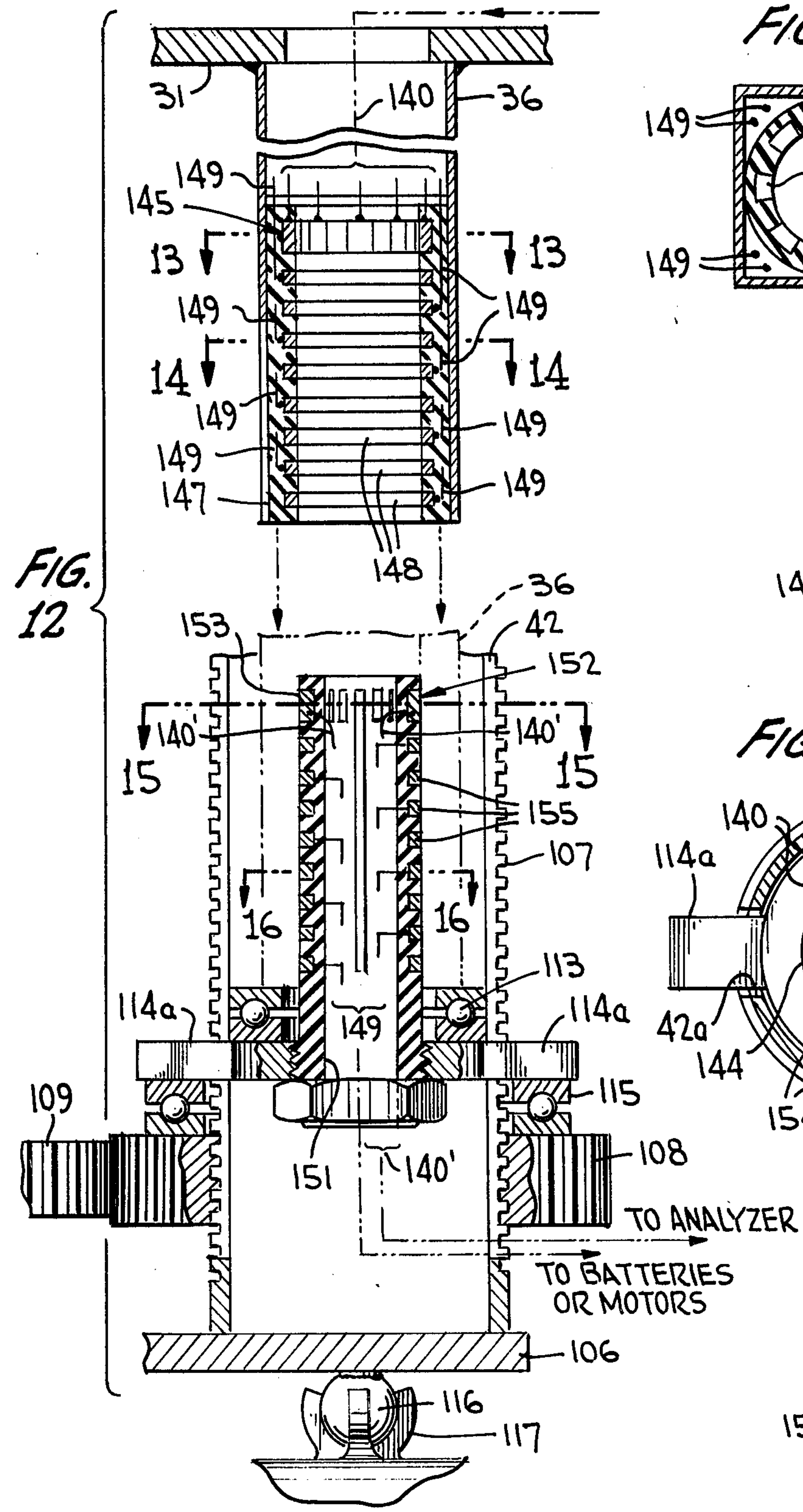
FIG. 12
FIG. 13
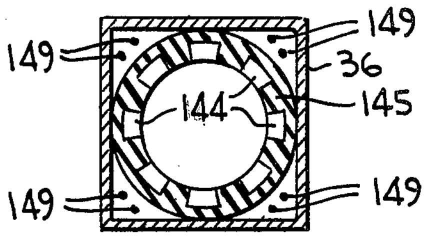
FIG. 14
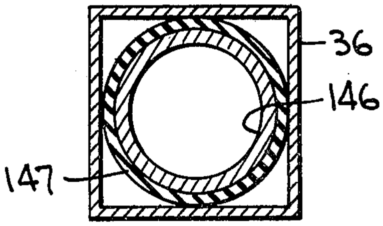
FIG. 15
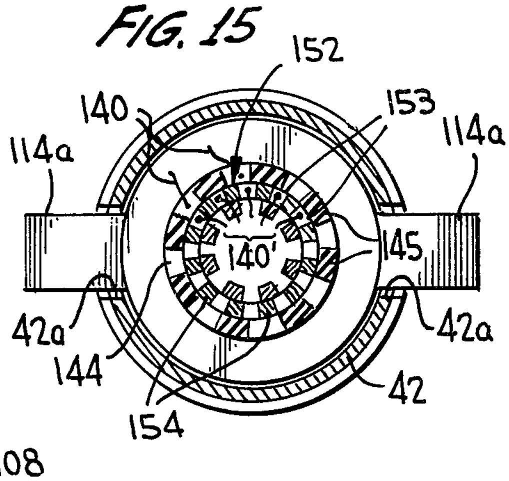
FIG. 16
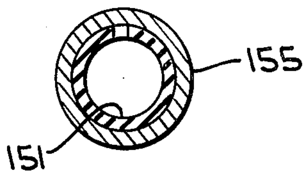

POWER OPERATED WHEELCHAIR

BACKGROUND OF THE INVENTION

This relates generally to a wheelchair assembly which is power driven and steered, although may be manually steered, and in which the seat may be raised and lowered, rotated and universally tilted. More particularly, the seat may be rotated and the wheels steered together or independently, and the wheels may be automatically aligned with the direction chosen for wheelchair travel.

Known motor assisted wheelchairs normally comprise a standard wheelchair capable of being power driven and steered. Such a power wheelchair typically has its occupant seat mounted on a pair of rather large rear wheels and a pair of front casters, the rear wheels capable of being power driven together or independently of one another to effect steering. If the same basic wheelchair frame is retained, the added weight and frame stress caused by the batteries and motor controlling mechanisms may result in considerable maintenance and repair costs and the attendant downtime needed to insure the safety and reliability of the wheelchair. Moreover, these power operated wheelchairs are heavy and cumbersome and cannot therefore be readily loaded into and unloaded from a motor vehicle, for example, for transport. The versatility during use of these wheelchairs is also lacking in that the seat occupant must always face in the same direction as the direction of travel thereby preventing the occupant to shift slightly to the left or to the right while facing forwarding as, for example, when seated at a dining table or when otherwise seated indoors. And, the fixed elevation of the seat above the ground, normally higher than a typical indoor seat, is not only distracting for the wheelchair-confined invalid when in the company of others not confined to a wheelchair, but is also inconvenient because the wheelchair occupant is unable to sit within a normal distance from a dining room table, for example, because of the seat height constraint.

Another drawback noted during operation of the presently available powdered wheelchairs concerns the safety harzard presented while moving along an incline or a decline such as a long walkway ramp. The weight of the occupant shifts the wheelchair center of gravity possibly causing the wheelchair-confined invalid to topple if left unattended. And, when particularly moving along an incline, the vision of the wheelchair occupant is blocked to some extent by being tilted rearwardly thereby creating a safety hazard especially if left unattended.

SUMMARY OF THE INVENTION

It is an object of the present invention to avoid the aforementioned drawbacks of the presently known powered wheelchairs which may not be operated more safely and reliably but with greater versatility than prior art designs and with reduced construction and maintenance costs thereby rendering the wheelchair easy and safe to operate, easy to assemble, structurally sound and convenient to transport.

Another object of this invention is to provide such a wheelchair as having a steering mechanism including a steering motor operatively connected to both the seat and the ground wheels so that in the traveling mode both the seat and the wheels may be turned together while facing in the same direction. The steering motor may otherwise be connected only to the seat so that it may be turned without turning the undercarriage on which the seat is mounted, or the steering motor may be connected only to the wheels so that the undercarriage may carry the occupant in any direction, such as sidewise, without turning the seat. As another alternative, the steering motor may be disconnected for manual operation of the wheelchair with seat rotation being directly coupled with the wheel alignment so that turning the seat by a wheelchair attendant also turns the wheel steering.

A further object of this invention is to provide such a wheelchair as including a so-called analyzer which compares the direction chosen to the actual direction of the wheels and then directs the steering mechanism to align the wheels to the direction chosen, without turning the seat. The seat may be rotated independently of the steering mechanism to face the chosen direction, or not, and the drive mechanism is provided for propelling the wheelchair in the chosen direction of the wheels.

A still further object of this invention is to provide such a wheelchair as having a seat tilt control which causes the seat to automatically tilt forwardly when the wheelchair is traveling at an incline, and to tilt rearwardly when the wheelchair is traveling at a decline, for example, so as to maintain the seat occupant in a substantially level position regardless of the attitude at which the wheelchair is traveling.

A further object of the present invention is to provide such a wheelchair wherein the seat is easily removable for disassembling it from the undercarriage during transport and for the replacement of different seat styles and the like. The undercarriage has a cylindrical side wall with a main support strap extending therealong as well as along the bottom wall for the support of the seat and for the support of the steering and the driving mechanisms.

Other objects, advantages and novel features of the invention will become more apparent from the following detailed description of the invention when taken in conjunction with the accompanying drawings.

BRIEF DESCRIPTION OF THE DRAWINGS

FIG. 12 is an expanded vertical section taken along line 12—12 of FIG. 10;

FIGS. 13, 14, 15 and 16 are sectional views taken respectively along lines 13—13, 14—14, 15—15 and 16—16 of FIG. 12;

DETAILED DESCRIPTION OF THE INVENTION

Figure 1:
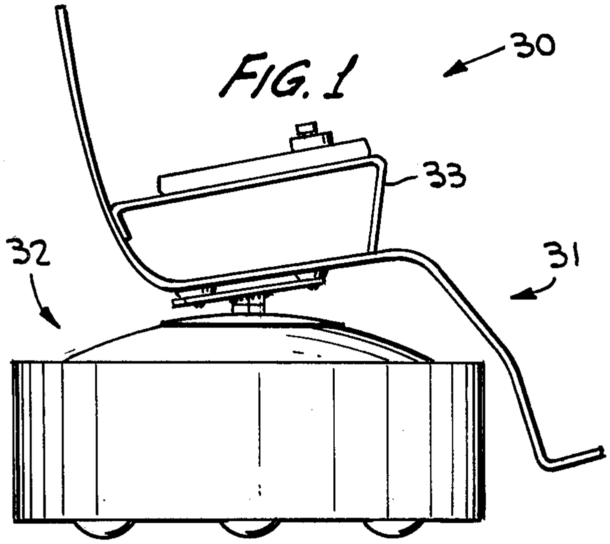
FIG. 1 is a side elevation view of the wheelchair assembly according to the invention which includes a removable seat mounted on an undercarriage.

Turning now to the drawings wherein like reference characters refer to like and corresponding parts throughout the several views, the wheelchair assembly according to the invention is generally designated 30 in FIG. 1 and includes a seat 31 removably mounted on an undercarriage 32. The seat body may be contoured and of the molded plastic variety of any shape, size, style, color, etc, having arms 33, and mounted as by fasteners 34 on a seat support plate 35. This plate is welded or otherwise affixed to a support post 36 of square cross-section (FIG. 3). The post extends through a square opening 37 provided in the center of a sprocket 38 having depending guides 39 (FIG. 10) in engagement with the underside of an annular flange 41 secured to the upper end of a hollow elongated tube 42. This tube has an inner diameter slightly greater than the outer diagonal of post 36 (FIG. 3) since the post is received within the tube for relative rotation about the post axis. Rotation of the post, together with the seat therewith, is effected by a steering motor 43 (FIG. 2) in the form of an electric motor operated from batteries 44 (FIG. 3). The steering motor has a bevel drive gear 45 in toothed engagement with another bevel gear 46 mounted on a shaft 47 for rotation therewith. A solenoid operated electric clutch generally designated 48 is provided at one end of shaft 47 for transmitting the rotation thereof to a sprocket 49. Another sprocket 51 is mounted on the bottom wall of undercarriage 32 for rotation about a vertical axis, and an endless chain 52 is in operative engagement with sprockets 49 and 51. (It should be pointed out that pulleys and belts may be substituted for the disclosed sprockets and chains, respectively). Rotation of sprocket 49 is therefore transmitted to a square rod 53 mounted at one end for sliding movement within a sleeve 54 having a square inner wall (see also FIG. 10) and being mounted for universal movement at its lower end to the upper end of sprocket 51. Such a universal joint may be in the form of a spider 55 and clevises 56. Another sprocket 57 is fixedly mounted on the upper end of rod 53 and is clamped as at 58 to tube 42. An endless chain 59 interengages with sprockets 38 and 57 (see also FIG. 3) for thereby transmitting rotation of shaft 47 to post 36 upon actuation of steering motor 43.

Undercarriage 32 has a cylindrical side wall 61 closed by a bottom wall 62 having circular openings 63 therein (see FIGS. 7 and 8) through which ground wheels 64 extend. An annular U-shaped beam 65 is secured at its base to the side wall at the upper end thereof (FIG. 2), and an elongated strip 66 extends downwardly from the bottom of beam 65 along the inner surface of the side wall and extends along the bottom wall. An additional pair of straps 67, spaced about 60° apart, extend in like manner from the bottom of beam 65, along the side wall and along the bottom wall and meet at opposite sides of the strap 66. A top wall 68 having a domed central portion is secured along the upper surface of beam 65. The top wall has an enlarged central opening 69 therein through which post 36 extends and is of a sufficient size to permit the post to tilt approximately 10° in any direction from the vertical. A cover plate 71 is slidably mounted over opening 69 and likewise has a central opening 72 therein through which post 36 extends. Plate 71 is of a sufficient size as to maintain opening 69 covered while the plate is shifted in a given direction by the tilting post 36.

Figure 7:
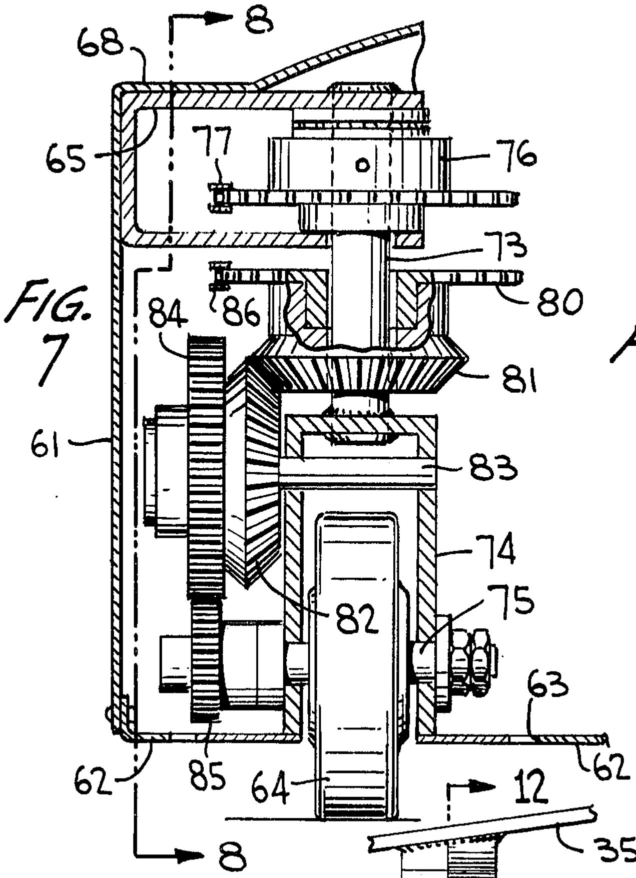
FIGS. 7 and 8 are detail front and side elevational views, respectively, of a ground wheel assembly including parts of the steering and drive mechanisms.
Figure 8:
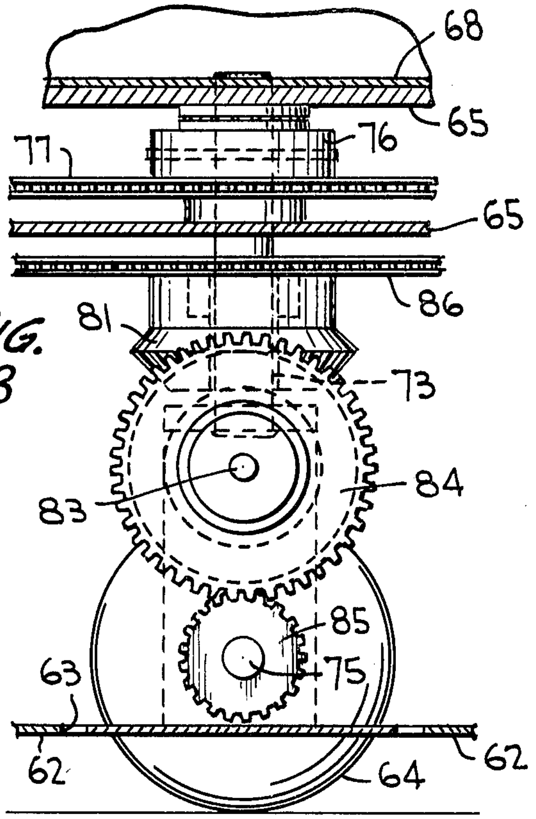

Referring to FIGS. 7 and 8, showing a typical ground wheel assembly for all six wheels, each wheel 64 is supported by a shaft 73 mounted on beam 65 for rotation about its central axis, the lower end of the shaft being fixedly secured to the base of a yoke 74 on which the ground wheel is rotatably supported by its axle 75. A sprocket 76 is fixedly secured to shaft 73 at its upper end, and an endless steering chain 77 interengages with the teeth of each of the sprockets 76 as shown in FIG. 3. A drive sprocket 78 (FIG. 2) is mounted near the upper end of shaft 47 and is engaged with steering chain 77 for driving the chain upon rotation of shaft 47. A solenoid operated electric clutch 79 transmits the rotation of shaft 47 to that of sprocket 77 for driving the steering chain whereupon the ground wheels may be rotated about the central axes of shafts 73 in unison, upon actuation of motor 43.

Returning to FIGS. 7 and 8, a drive sprocket 80 loosely surrounds shaft 73, and a double bevel gear 81 is fixedly secured to sprocket 79 for rotation therewith. This bevel likewise loosely surrounds shaft 73, and is in toothed engagement with another bevel gear 82 mounted on a shaft 83 which is rotatably mounted on yoke 74. A gear wheel 84 is mounted on bevel gear 82 in toothed engagement with another gear wheel 85 fixedly mounted on axle 75. An endless drive chain 86 interengages with the teeth of each of the drive sprockets 79 associated with the ground wheels and is driven by an electric drive motor 87 (FIG. 2) for rotating the ground wheels about their central axes as rotation of drive sprockets 80 is transmitted via gears 81, 82, 84 and 85 to the wheel axles.

Figure 9:
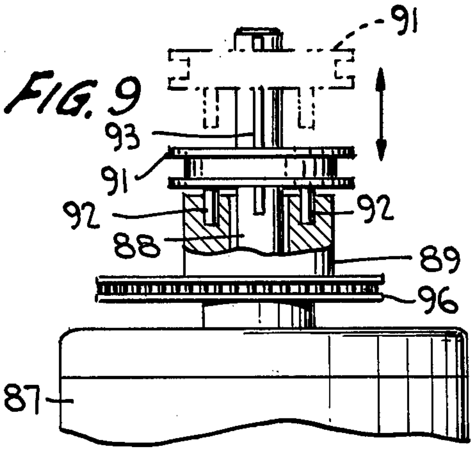
FIG. 9 is a detail view showing a manual disconnect feature for the drive motor.

Drive motor 87 (FIG. 2) is powered by batteries 44 and rests on support strap 66. The drive motor has a drive shaft 88 (FIG. 9) and a drive sprocket 89 is mounted on this shaft for relative rotation. A manually operated clutch plate 91, having downwardly extending pegs 92 thereon, is mounted for sliding movement on shaft 88 in the direction of the double arrow. A spline 93 on shaft 88 is received within a slot (not shown) located in the central opening of the clutch plate, and pegs 92 in the downward position of the clutch plate are received within corresponding holes provided in the upper surface of the sprocket 89. Rotation of shaft 88 is therefore transmitted to sprocket 89 via the clutch plate when in its downward position of FIG. 9. The clutch plate may be manually elevated at its phantom outline position until its pegs 92 disengage from the holes in sprocket 89 so as to disconnect drive motor 87 from sprocket 89 during the manual steering of the wheelchair to be more fully described hereinafter.

A shaft 94 (FIG. 2) is rotatably mounted on beam 65 and has a sprocket 95 fixedly mounted thereon (FIG. 3), and an endless chain 96 interengages with sprockets 89 and 95. Shaft 94 extends downwardly from beam 65 and has a sprocket 97 at its lower end. Another shaft 98 is rotatably mounted on beam 65, extends downwardly therefrom and has a sprocket 99 at its lower end, and an endless chain 101 interengages with sprockets 97 and 99 for transmitting rotation of drive shaft 88 to shaft 98 via chain 96, sprockets 89, 95, chain 101 and sprockets 97, 99. A sprocket 102 on shaft 98 is in engagement with drive chain 86 for thereby operating the drive of the ground wheels upon actuation of the drive motor.

Figure 2:
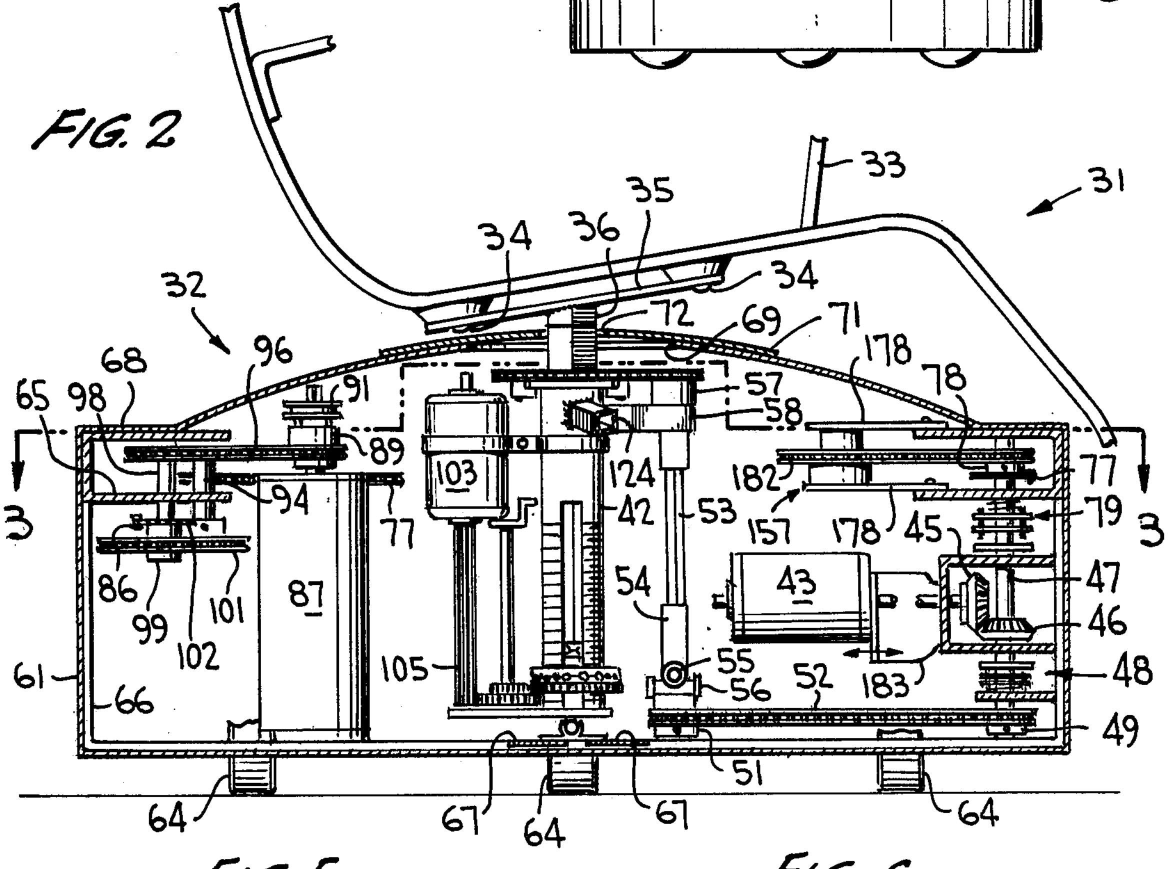
FIG. 2 is a vertical section taken through the undercarriage at a slightly enlarged scale.
Figure 5:
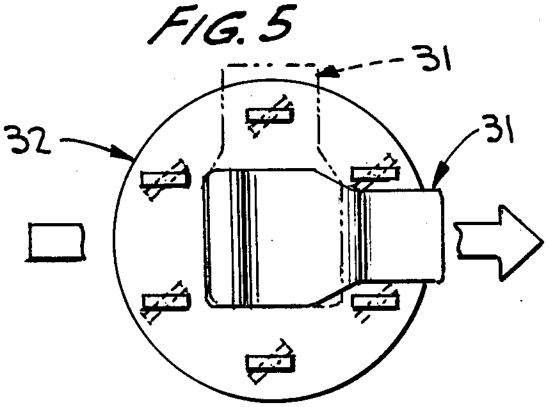
FIG. 5 is a schematic illustration in top plan showing different modes of travel capable for the wheelchair.
Figure 3:
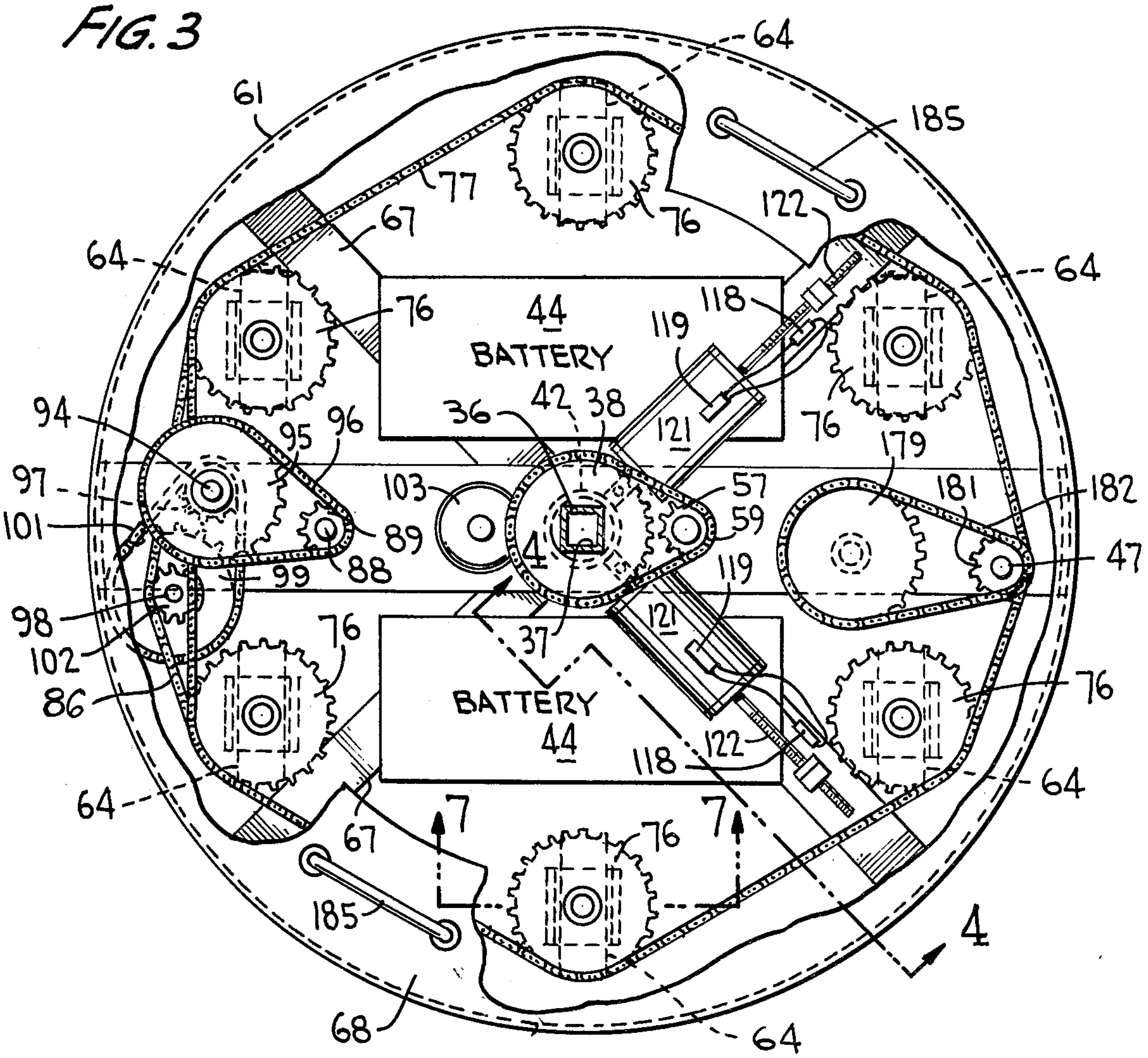
FIG. 3 is a top plan view of the undercarriage, taken along the line 3—3 of FIG. 2, with the top cover broken away for clarity.
Figure 10:
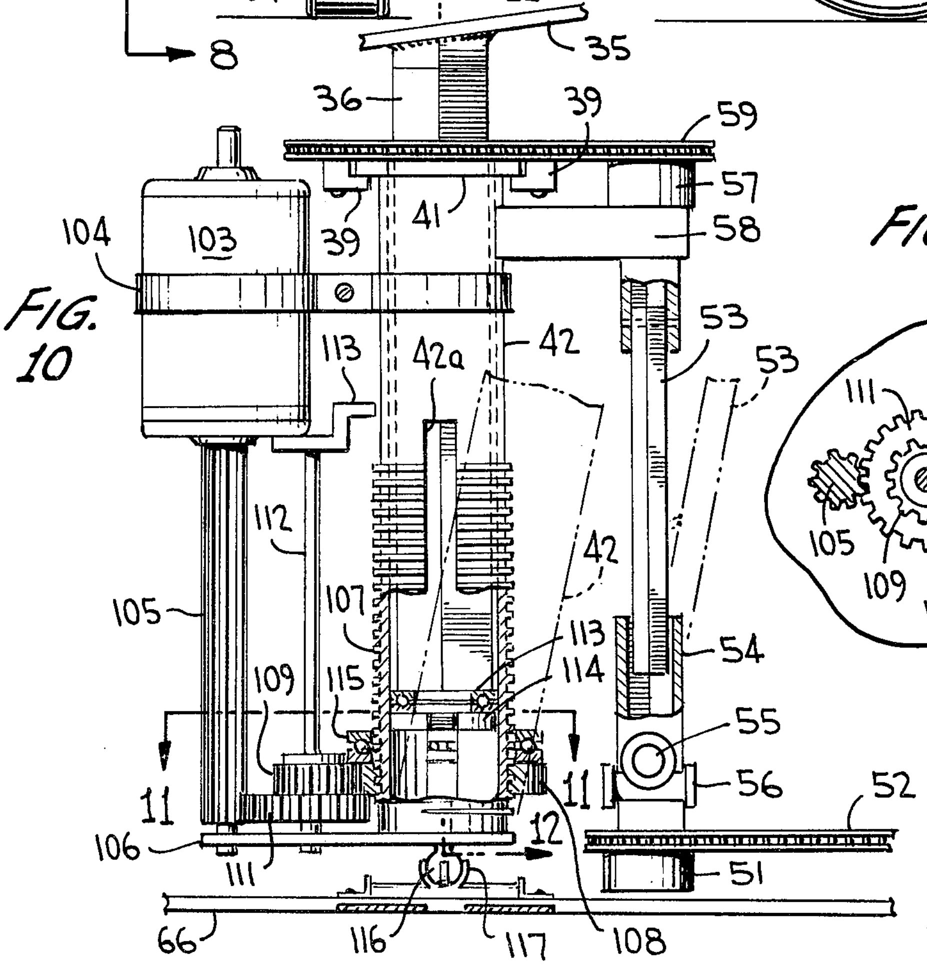
FIG. 10 is a detail view of side elevation of the lift mechanism for the seat.
Figure 11:
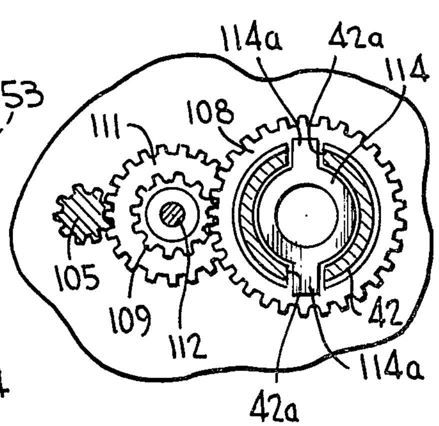
FIG. 11 is a section taken along 11—11 of FIG. 10.

The seat is capable of being raised and lowered relative to the undercarriage by means of an electric lift motor 103 shown in FIGS. 2 and 10. The motor is powered by batteries 44 and is clamped as at 104 to tube 42. The lift motor has a downwardly extending elongated drive gear 105 rotatably supported at its lower end on a plate 106 affixed to the lower end of tube 42. The tube is outwardly threaded as at 107 and an internally threaded gear wheel 108, located at the bottom of tube 42, is in threaded engagement with threads 107. Gears 109 and 111 are secured together and are rotatably mounted on a guide rod 112 affixed at its lower end of plate 106 and at its upper end to a bracket 113 secured to both tube 42 and lift motor 103. Gears 105 and 111 are in toothed engagement as are gears 109 and 108 (see also FIG. 11). The bottom of post 36 rests on an anti-friction bearing 113 which in turn rests on a bearing plate 114 having ears 114*a* extending outwardly through longitudinal slots 42*a* located in tube 42. Ears 114*a* of the bearing plate rest on the top of an anti-friction bearing 115 which in turn rests on the top of gear 108. Thus, actuation of lift motor 103 rotates gear 105 and, via gears 111 and 109, gear 108 is caused to rotate so as to thread upwardly along the threads of tube 42. The bearing plate is accordingly lifted and guided along slots 42*a* without rotation an permitted by bearing 115 and without rotation of post 36 as facilitated by bearing 113. Gears 109 and 111 are guided along rod 112 during upward movement of the seat, downward movement being facilitated upon a reversal of gear rotation.

Figure 6:
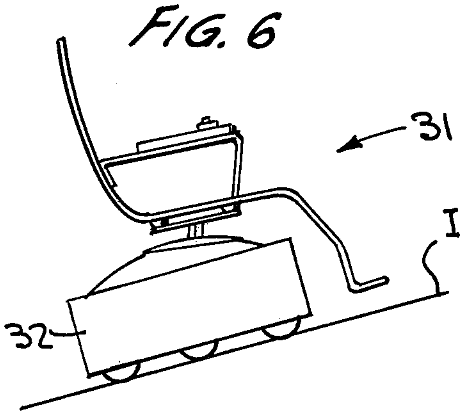
FIG. 6 is a schematic side elevation of the wheelchair assembly showing the seat automatically tilted forward while the wheelchair travels up an incline.
Figure 4:
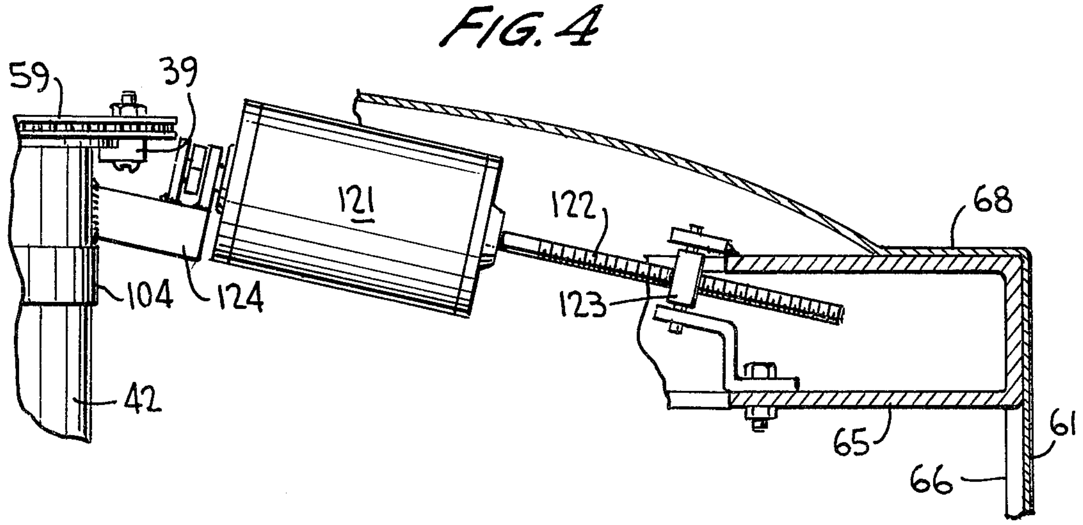
FIG. 4 is a detail view of one of the levelling motors.

Another feature of the present invention is the ability of the wheelchair seat to tilt relative to the undercarriage when moving up an incline as, for example, shown in FIG. 6, or when moving down a decline (not shown). Tube 42 has at its lower end a spider 116 received on a rocker 117 mounted on strap 66. Both tube 42 and rod 53 are therefore mounted for universal movement into an angle of approximately 10° from the vertical as shown in phantom outline in FIG. 10. Inclined movement of the wheelchair is sensed by mercury switches 118 (FIG. 3) mounted on two corresponding faces of post 42 and being operatively interconnected with solenoids 119. Tube 42 is tilted forward about its universal joint when the wheelchair moves up an incline I (FIG. 6), and is tilted rearward when the wheelchair moves down a decline (not shown). The tilting is carried out by electric leveling motors 121, as seen in FIG. 3, which are disposed perpendicular to one another and which are the type having elongated screw rods 122 extending therefrom. As more clearly seen in FIG. 4, these rods threadedly engage nuts 123 mounted on beam 65, and the opposite end of each motor 121 is connected to tube 42 by means of a bracket 124. Solenoids 119 are operatively connected with the respective leveling motors which are powered by batteries 44. Thus one or the other or both leveling motors will be actuated, depending on the direction of incline movement of the wheelchair, as sensed by a mercury switch or switches so as to cause the chair to tilt forwardly to the extent necessary during travel of the wheelchair up an incline. Of course, the seat will be similarly tilted rearwardly during travel of the wheelchair down a decline. If the incline or decline movement of the wheelchair proceeds in a direction along the central axis of one of the leveling motors, only that one leveling motor is arranged to be actuated to compensate for the incline or decline movement. Otherwise, both leveling motors will be actuated to compensate for incline and decline movement in directions other than along central axis of either leveling motor. The wheelchair may thus remain in a substantially horizontal position while traveling along either an incline or a decline.

A steering control system is provided for controlling the orientation of the ground wheels as well as the orientation of the seat, when the initial orientation relative to one another is unknown. An approach to take is to first align the wheels in the approximate direction desired. Then, the wheels may be steered by nudging them to the right or to the left so as to cause slight rotation thereof about their vertical axes, as desired during travel. Steering motor 43 is turned on and off as needed during steering.

Figure 17:
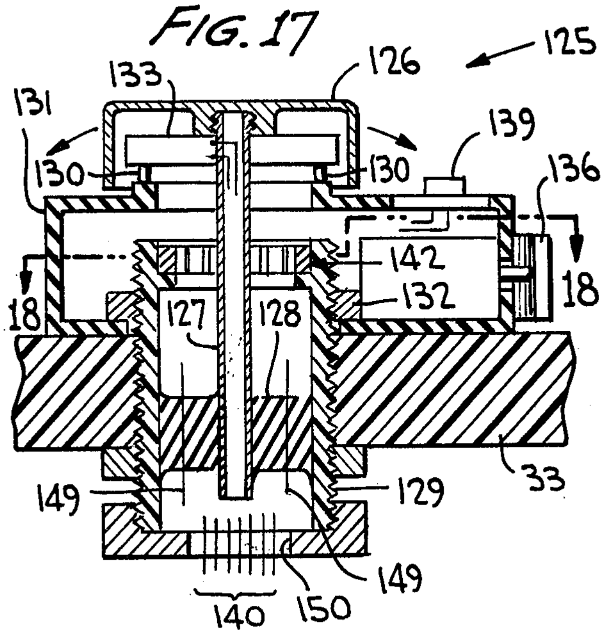
FIG. 17 is a vertical section taken through the control assembly provided on the seat of the wheelchair.

Alignment of the wheels to the chosen direction of travel is carried out by manipulating a control generally designated 125 in FIG. 17. This control is mounted on an arm 33 of the seat and includes a knob 126 having a central metal stem 127 secured to an elastomeric ring 128 mounted on the inside of a non-metallic bushing 129 threaded to arm 33. A non-metallic housing 131 is held down on the top of the arm by means of a nut 132 in engagement with bushing 129. A plate 133 is mounted on the stem 127 for the actuation of microswitches 130 wired to motor 43 for effective chair rotation upon corresponding rotation of knob 126 about the stem axis. Button 132 may be mounted on housing 131 for actuating a light wired to the batteries, and a switch plate 136 is mounted on the housing for pivotal movement about its center so as to actuate one or the other of microswitches 137, 138 wired to lifting motor 103 for causing the seat to be raised and lowered upon actuation thereof by the seat occupant. Also, a speed control slide 139 is wired to drive motor 87 for speed control of the wheelchair by the occupant in a convenient manner. A trickle charge indicator 141 may also be provided on housing 131 and appropriately wired to the batteries for indicating the battery charge.

Figure 18:
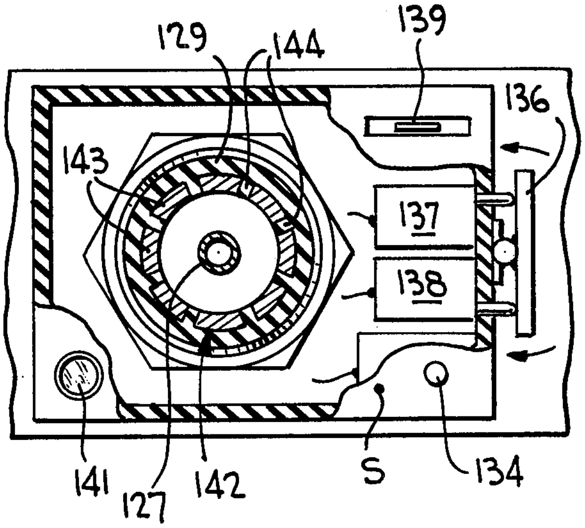
FIG. 18 is a section taken along line 18—18 of FIG. 17.

A ring 142 (FIG. 18) comprising eight metallic contact elements equally spaced apart and separated by dielectric material 144 is mounted at the upper end of bushing 129, and elements 143 are respectively wired to like elements 144 spaced equally apart in a ring 145 of dielectric material (see FIGS. 12 and 13). Elements 143 are of a sufficient size relative to stem 127 so that only one of these elements is contacted one-at-a-time by the stem upon the tilting thereof as in the direction of the arrows shown in FIG. 17. Referring to FIG. 12, it can be seen that dielectric ring 145, with its evenly spaced electrical contacts 144, is mounted within square post 36 which is secured to the underside of the seat base. The eight contacts of ring 142 are respectively wired to the eight contacts 144 of ring 145. Beneath ring 145 are stacked eight rings 146 of electrically conducting material embedded within a hollow cylinder 147 of dielectric material and being spaced equal distances apart by rings 148 of electrically conducting material. The eight selections described above, namely, the up-down switches 137, 138, the left/right switches 130, the high speed/higher speed control 139, and the light/bell controls 141/134, are each wired as at 149 and extend down through opening 150 of a cap covering bushing 129 and into post 36 so as to lie at the corners thereof outwardly of ring 145 as shown in FIG. 13. Wires 149 are embedded in dielectric cylinder 147 and are respectively wired to rings 146.

An upstanding cylinder 151 of dielectric material is threaded at its lower end to bearing plate 114, as shown in FIG. 12, and is of a height extending upwardly from bearing 113 equal to the length of cylinder 147. A ring 152 is located at the upper end of cylinder 151 and is comprised of twelve elements 153 of electrical contact material of equal size and spaced equally apart by means of twelve elements 154 (FIG. 15) of dielectric material. Ring 152 is so disposed as to lie in the same plane as ring 145 with the outer and inner diameters of these rings being the same so that at least one and no more than two elements 153 contacts elements 144. And, eight stacked rings 155 of electrical contact material surround cylinder 151 and are maintained equally spaced apart by rings 156 of dielectric material, rings 146 and 155 being so disposed as to contact one another when post 36 is assembled over cylinder 151, as shown in phantom outline in FIG. 12. Wires 149 extend from the eight rings 155 through cylinder 151 and interconnect with lifting motor 103, drive motor 87, steering motor 43 and batteries 44, respectively. A ground wire in addition to these wires 149 is also appropriately connected in place.

Figure 19:
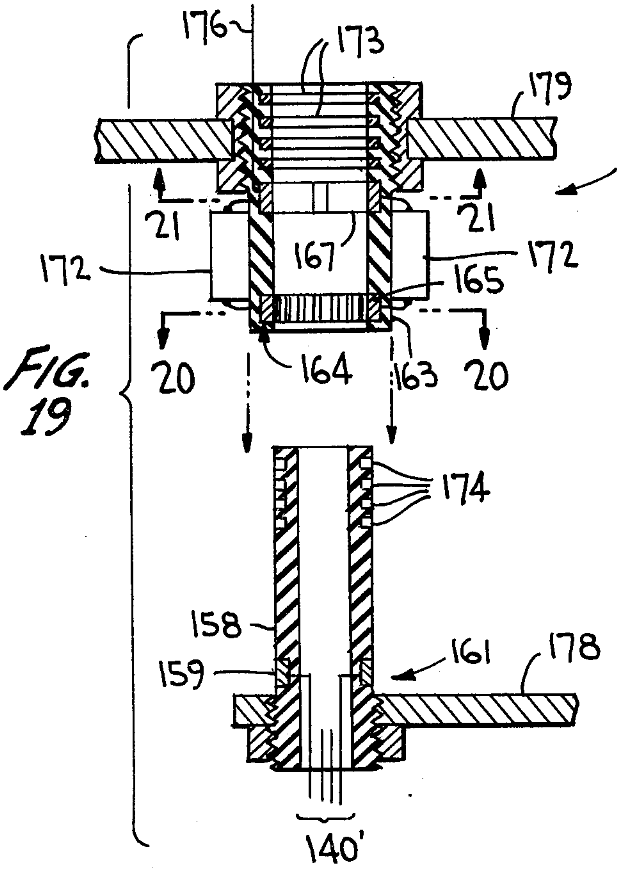
FIG. 19 is an expanded, vertical section of parts of the analyzer.
Figure 20:
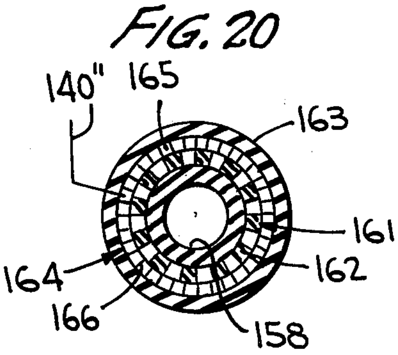
FIGS. 20 and 21 are, respectively, sectional views taken along lines 20—20 and 21—21 of FIG. 19.
Figure 21:
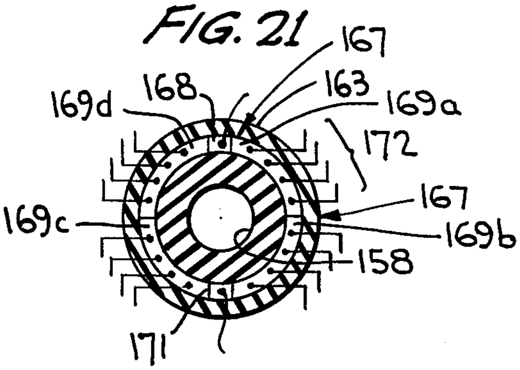

Eight wires 140 respectively interconnect contacts 143 and 144, and twelve wires 140' lead from contacts 153 (FIG. 15) and outwardly through the bottom of cylinder 151 to an analyzer assembly 157 shown in FIG. 19. This assembly, as shown in FIG. 2, is mounted on beam 65. The twelve wires 140' extend into the bottom of a hollow cylinder or stator 158 of dielectric material and are anchored to twelve electric contacts 159 of ring 161 which contacts are of equal size and equally spaced apart by elements 162 of dielectric material. The analyzer includes another cylinder or rotor 163 of dielectric material which rotates relative to cylinder 151 and is assembled thereover. When assembled, a ring 164 lies in the same plane as ring 161 and has eighteen electric contacts 165 of equal size and held equally spaced apart by means of elements 166 of dielectric material (FIG. 20). Contact elements 159 therefore connect to one or two, but no more, of eighteen of the contacts 165. A ring 167 is located on cylinder 163 spaced from ring 164 and includes a pair of opposed relatively short contacts 168 (FIG. 21) of equal size and four larger equally sized contacts 169*a, b, c* and *d*. The contacts are separated by dielectric elements 171. Eighteen protective diodes 172 are electrically interconnected with rings 164 and 167, the diodes being of any standard type permitting current to flow only one way since four diodes 172 are connected to each of the larger contacts 169 and must therefore be of the one-way variety of avoid current from flowing back to ring 164. The remaining two diodes are connected to the shorter contacts 168. A series of four electrical contact rings 173 are likewise embedded in cylinder 163 and are spaced apart by the dielectric material of the cylinder. Another set of electrical contact rings 174 are embedded at the outer diameter of cylinder 158 and are likewise equally spaced apart by the dielectric material of the cylinder, the rings of both sets being so disposed as to respectively lie adjacent to and in contact with one another when rotor 163 is assembled over stator 158. Electrical contact elements 169 of ring 167 are respectively connected to rings 173 by wires 175, and the shorter contacts 168 are respectively connected to forward and reverse sides of drive motor 87 by means of wires 176. Another set of wires 177 interconnect rings 174 with steering motor 43, the first and third wires being connected to the right turning side of the steering motor and the second and fourth wires being connected to the left turning side of the steering motor.

The analyzer assembly is mounted on beam 65 (see FIG. 2) by means of support plates 178 respectively connected to the stator and the rotor of the assembly. A sprocket wheel 179 (see FIG. 3) is fixedly mounted on the stator, and another small sprocket wheel 181 is fixedly mounted on shaft 47. An endless chain 182 extends about these sprockets for transmitting the rotation of shaft 47 to the rotor of the analyser assembly.

As shown in FIG. 2, bevel gear 45 which is rotated by the steering motor 43 is mounted for axial movement in toothed engagement with bevel gear 46, as shown in the drawing, and is capable of being manually moved out of such toothed engagement by means of a plate 183 mounted on the shaft of gear 45. As will be more fully described hereinafter, the steering motor may be deactuated manually by shifting plate 183 to the left as seen in FIG. 2 when it is desired to manually steer the wheelchair.

With the present arrangement the wheelchair is capable of several modes of operation. It can be manually operated by first pushing a toggle switch S or the like on control housing 131 into an OFF position so as to deactivate clutches 48 and 79 which are so arranged that a pair of opposing plates thereof are coupled together under the force of a spring when the power is turned off. Rotation of shaft 47 is therefore transmitted to sprocket 78 associated with steering chain 77, and to sprocket 49 associated with chain 52. Plate 183 is then shifted to the left so as to disengage bevel gears 45 and 46. A portion of the plate may conveniently extend outwardly through the undercarriage for access so as to disengage the steering motor. Also, the drive motor may be disengaged by moving clutch 91 (FIG. 9) to its phantom outline position thereby allowing drive sprocket 89 to freely rotate. It can be therefore seen that the seat rotation is coupled with the steering chain so as to by-pass the steering motor whereupon rotation of the seat about its central axis by an attendant in either direction will cause the ground wheels to be steered in a corresponding direction. Manual movement of the wheelchair by the attendant allows the undercarriage to move on the ground wheels while by-passing the drive motor.

The wheelchair may be automatically operated by the seat occupant as follows. Stem 127 is shifted into the direction the wheelchair is intended to move. The seat occupant merely grasps control knob 126 and shifts it in that direction until the stem contacts one of the electrical contact elements 143 of ring 142. Assume, for example, that the ground wheels are facing north, the seat is facing south and the intended wheelchair direction is east. Stem 127 is therefore shifted into an easterly direction so that when it contacts an element 143 current flows through one of the wires 140 to one of the contact elements 144 of ring 145 located near the top of the post base and flows via a contiguous contact 153 of ring 152 out through the bottom of cylinder 151 via one of the wires 140' and into the base of the analyzer assembly (FIG. 19).

Electric current through this wire 140' flows through its associated contact 159 of ring 161 and via an appropriate one of diodes 172 to a connected contact 169 of ring 167. From there current flows to a connected ring 173 via a wire 175 and from a contiguous ring 174 via a wire 177 to steering motor 43. Appropriate means are provided in any normal manner for cutting the power to clutches 48 and 79 in and out so that under the circumstances given in the above example, the plates of clutch 48 are causes to disengage and the plates of clutch 79 are caused to engage so that the steering motor will be actuated for steering the ground wheels while the seat remains in its southerly position. The first and third wires 177 may, for example, be associated with contacts 169*a* and 169*c* and are connected to the steering motor for effecting a clockwise wheel steering direction, while the second and fourth wires 177 are associated with contacts 169*b* and 169*d* and are connected to the steering motor for effecting a counterclockwise wheel steering direction. Assuming the one wire in question to be associated with contact 169*a*, the steering motor will be energized for rotating the wheels clockwise and for correspondingly rotating the rotor 163 of the analyzer assembly clockwise via sprockets 179, 181 and chain 182, which thereby causes ring 167 of the rotor to rotate clockwise which causes ring 164 to likewise rotate until the contact 165 thereof which is interconnected with contact 168 via diodes 172 is brought into alignment with that contact element 159 of ring 161 which is energized and represents the direction in which the wheelchair is intended to move. Drive motor 87 is then actuated instantaneously via wire 176 connected to element 168. The wheelchair is therefore driven forward in the intended direction of travel. In the meantime, the seat remains facing in a southerly direction while the wheelchair is moving east. The seat occupant may wish to retain such a seated position relative to travel while, for example, being seated at a dining table or elsewhere when it is intended to face in one direction and move in the other. Otherwise, the seat occupant may simply rotate knob 126 so as to trip microswitch 130 which is wired to the steering motor and to electric clutch 79 for disengaging the clutch plates so that the steering motor, when actuated, will only rotate the seat in the intended direction without effecting the steering of the wheels. Seat rotation may be stopped simply by releasing knob 126. However, when the seat is rotated as aforedescribed into a position coinciding with the wheel direction, the tilting of stem 127 into some other direction of intended travel causes the clutch plates of both clutches 79 and 48 to be coupled together so that steering motor 43 steers the wheels and rotates the seat together so as to continue to face in the same direction during this mode of travel. The current to the drive motor in this mode activates a solenoid or microswitch (not shown) which disconnects the analyzer's influence over the steering and causes the steering motor to receive its instructions only from control 125 directly and not through the analyzer. The drive motor may drive the wheels "backward" or "forward" which coincides with contacts 168 of ring 167.

If the patient wants to elevate the seat, he simply depresses lever 136 so as to trip microswitch 137 which is wired to lift motor 103 causing it to rotate for elevating the chair as gear 108 (FIG. 10) threads upwardly along tube 42 and thereby lifts bearing plate 14 and post 36 along with it. If it is desired to lower the chair from a position elevated above that shown in FIG. 2, the seat occupant merely depresses lever 136 so as to trip microswitch 138 which is appropriately wired to lift motor 103 for actuating it so as to lower the seat.

While the wheelchair is moving up an incline I (FIG. 6), such as a walk ramp, the seat automatically tilts forwardly as determined by the extent that a mercury droplet of one of mercury switches 118 moves into contact with one of its ends provided (not shown) in any normal manner. Making contact with these electrical switches in one or both leveling motors 121 causing its screw 122 to rotate in an appropriate direction for increasing or decreasing the distance between tube 42 and beam 65. If the direction of travel coincides with central axis of either leveling motor, then only that motor need be actuated. However, if the tilting direction lies at an angle to the leveling motors, then both motors will need to be actuated.

In order to reduce the tug on the steering motor when the drive motor is operating, a differential may be interposed to provide an equal counteracting tug, thus leaving the steering free from drive motor interference.

The present wheelchair assembly can be easily transported in a passenger car or the like since the seat may be simply removed by lifting its post 36 out of tube 42. The seat may then be conveniently stored in the vehicle and the carriage may be lifted with the aid of a pair of opposed lifting handles 185 (FIG. 3) extending outwardly of wall 68 and secured to beam 65. And, seats of other styles, shapes, colors, etc., may be interchanged and assembled with the same undercarriage so long as each seat has a square post 36 of the same size to be accommodated by tube 42.

From the foregoing it can be seen that a fully automated wheelchair has been devised and has much more versatility in the manner in which it is capable of functioning as compared to known wheelchair designs. The wheelchair is capable of being automatically steered while the chair faces in the same direction as the ground wheels, and is also capable of being shifted in a direction other than the direction in which the seat faces. The seat may be rotated relative to the undercarriage without rotating the wheels, and the wheels may be steered or rotated without rotating the seat. Moreover, the steering and driving motors may be manually disconnected by plates 183 and 91 so that the wheelchair may be pushed by an attendant and manually steered by the attendant simply by rotating the chair in the intended direction of travel.

The seat is capable of being raised and lowered automatically, and may be disassembled from the undercarriage to conserve space during storage and transport. Also, when moving along an incline or a decline, the seat automatically shifts correspondingly forward or rearward so as to maintain the seat occupant in as normal a seated position as possible. And, the undercarriage of the wheelchair is compact and small enough to move through standard doorways, and is so constructed that the seat as well as the driving, steering and lifting motors are all supported on a single support strap, while the drive and steering mechanisms are supported on an annular beam as are the tilting motors.

Obviously, many modifications and variations of the present invention are made possible in the light of the above teachings. For example, an alternative type of analyzer could be devised which would include a differential with one side thereof connected to the wheels and the other side connected to the seat. Also, a different type of control mechanism such as a shielded broadcast could be used wherein the transmitter and receiver of the known "walkie-talkie" variety could be used to transmit the signals required. Or, transmission of the signals could be carried out by coded pulse using a single wire. It is therefore to be understood that within the scope of the appended claims the invention be practiced then otherwise than as specifically described.

What is claimed is:

1. A wheelchair assembly including a seat having a plurality of ground-engaging wheels, comprising, a undercarriage on which said wheels are mounted for rolling movement about horizontal axes lying parallel to one another, means engaging said wheels for simultaneously driving same in at least one rolling direction, said wheels being mounted for pivotal movement about vertical axes, means engaging said wheels for simultaneously steering same by pivoting said wheels together about said vertical axes, said seat being mounted on said undercarriage for rotary movement about a vertical axis, said steering means being coupled with said seat for effecting the rotary movement thereof, and control means for operating said driving means and said steering means, whereby both said wheels and said seat are moved about their respective axes by said steering means upon actuation of said control means.

2. The assembly according to claim 1, wherein said steering means is arranged for selective disengagement from said wheels so as to effect only the rotary movement of said seat upon actuation of said control means.

3. The assembly according to claim 1, wherein said steering means is arranged for selective uncoupling from said seat so as to effect only the steering of said wheels upon actuation of said control means.

4. The assembly according to claim 1, wherein said steering means includes a steering motor arranged for selective disengagement from both said seat and said wheels, whereby said wheels may be manually steered upon the rotary movement of said seat.

5. The assembly according to claims 1, 2, 3 or 4, wherein said seat is mounted on said undercarriage for movement along said vertical axis thereof, and means is provided in engagement with said seat for raising and lowering same relative to said undercarriage, said control means operating said raising and lowering means.

6. The assembly according to claims 1, 2, 3 or 4, wherein said seat is mounted on said undercarriage for universal movement about a bearing point, sensing means on the assembly for detecting any inclined and declined movement thereof, and extendable support means maintaining said seat in a predetermined seating position, said support means being interconnected with said sensing means and being operable for pivoting said seat about said bearing point in opposition to the inclined and declined movement of the assembly.

7. The assembly according to claims 1, 2, 3 or 4, wherein said driving means includes an endless drive chain in engagement with drive sprockets provided on said wheels, gears provided on said sprockets and said wheels being in toothed engagement for effecting the rolling movement of said wheels upon actuation of said drive chain.

8. The assembly according to claim 7, wherein said steering means includes an endless steering chain in engagement with steering sprockets provided on said wheels, wheel housings supporting said wheels and shafts interconnecting said steering sprockets with said housings and loosely extending through said drive sprockets, whereby the pivotal movement of said wheels is effected upon actuation of said steering chain.

9. The assembly according to claim 1, wherein said seat has a support post thereon mounted on said undercarriage for rotation about the axis of said post, said steering means being coupled with said support post for effecting the rotary movement of said seat upon the actuation of said control means.

10. The assembly according to claim 9, wherein said steering means includes an endless steering chain in engagement with steering sprockets provided on said wheels, and includes steering drive means operated by a steering motor capable of operating said chain and rotating said seat.

11. The assembly according to claim 10, wherein said steering drive means is in operative engagement with both said chain and said support post, and said motor being selectively disengageable from said steering means, whereby rotary movement of said seat causes the pivoting of said wheels for steering same.

12. The assembly according to claim 10, wherein said steering drive means is in operative engagement with both said chain and said support post, and clutch means are disposed in said steering drive means between said motor and said seat for disengaging said motor from said seat, whereby only said wheels may be steered without rotating said seat.

13. The assembly according to claim 10, wherein said steering drive means is in operative engagement with both said chain and said support post, and clutch means are disposed in said steering drive means between said motor and said steering chain for disengaging said motor from said chain, whereby only said seat may be rotated without steering said wheels.

14. The assembly according to claim 6, wherein said seat has a support post mounted thereon and is received within a hollow tube mounted on said undercarriage for universal movement about the bearing point, said extendable support means being connected to said tube for tilting said seat about said bearing point.

15. The assembly according to claim 5, wherein said seat has a support post mounted thereon and being received within a hollow tube mounted on said undercarriage for universal movement about a bearing point, said raising and lowering means engaging said support post for moving said seat along said vertical axis thereof.

16. The assembly according to claim 7, wherein said driving means includes a drive motor in operative engagement with said drive chain, and means for selectively disengaging said drive motor from said drive chain to facilitate manual movement of the assembly.

17. The assembly according to claim 1, wherein said control means includes an analyzer assembly having a rotor operatively connected with said steering means for rotation together with the pivoting of said wheels, said control means further including a manually operated control assembly mounted on said seat and being electrically interconnected from an electrical power source with said driving means with said steering means and with said analyzer via sets of electrical contacts provided wherein predetermined ones of which are associated with different steering and driving modes, one of said sets of contacts including directional segments which are rotated with said analyzer for limiting the extent of the pivoting of said wheels depending on the steering mode selected by said control assembly.

18. The assembly according to claim 17, wherein said steering means includes an endless steering chain in engagement with steering sprockets provided on said wheels, said analyzer including a sprocket in engagement with said steering chain for effecting rotation of said directional segments.

19. The assembly according to claim 18, wherein said sets of contacts are arranged annularly and are stacked, said control assembly further including a control knob having a shaft mounted for universal tilting movement about the base thereof, said shaft being movable into contact engagement with a selected one of said contacts of one of said sets for operating said steering and said driving means.

20. The assembly according to claim 1, wherein said seat has a support post mounted thereon and is removably received within a hollow tube mounted on said undercarriage, whereby said seat may be removed from said undercarriage during transport and/or storage of the wheelchair assembly, and seats of different styles and/or configuration compared to said seat may be substituted if desired.

21. The assembly according to claim 1, wherein said undercarriage has a substantially cylindrical side wall and a bottom wall having openings through which said ground-engaging wheels extend, an elongated support strap extending along the inner surfaces of said side and said bottom walls, said steering means including a steering motor and said driving means including a driving motor, said seat and said motors being supported on said strap.

22. The assembly according to claim 21, wherein said seat has a support post mounted thereon and is removably received within a hollow tube mounted on said strap, an annular structural beam mounted on said side wall at an upper end thereof, and said driving means and said steering means being further supported on said beam.

23. The assembly according to claim 6, wherein said seat has a support post mounted thereon and is removably received within a hollow tube mounted on said bearing point, said undercarriage having a substantially cylindrical side wall, a bottom wall having openings through which said wheels extend, and a top wall having a first central opening of a size permitting said post and said tube to pivot about said bearing point without interference, a slidable cover having a central second opening slightly greater than the cross-section of said tube and spanning said first opening, said tube extending through both said openings and causing said cover to slide during the pivoting of said seat.

* * * * *